United States Patent Office 3,507,992
Patented Apr. 21, 1970

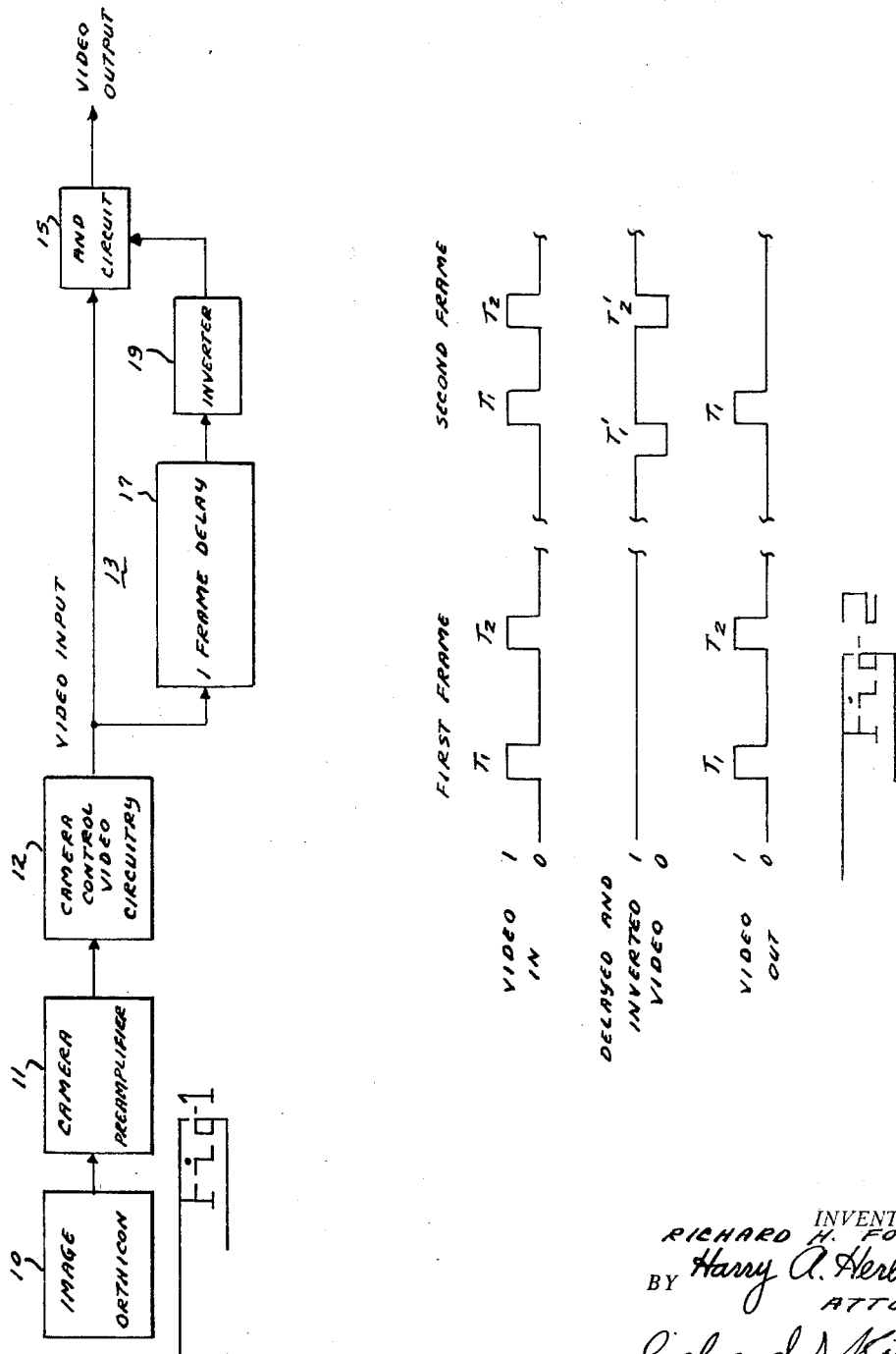

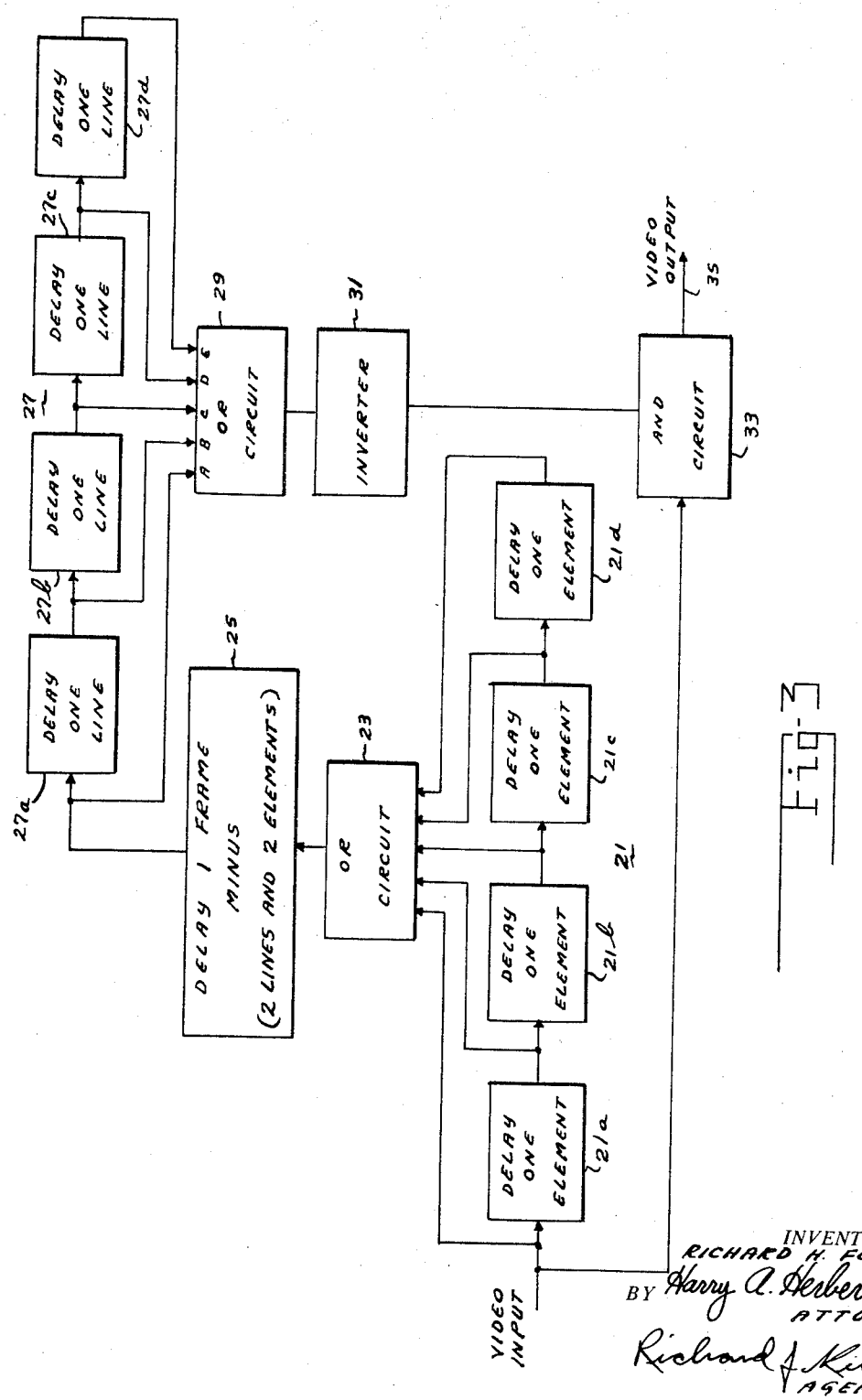

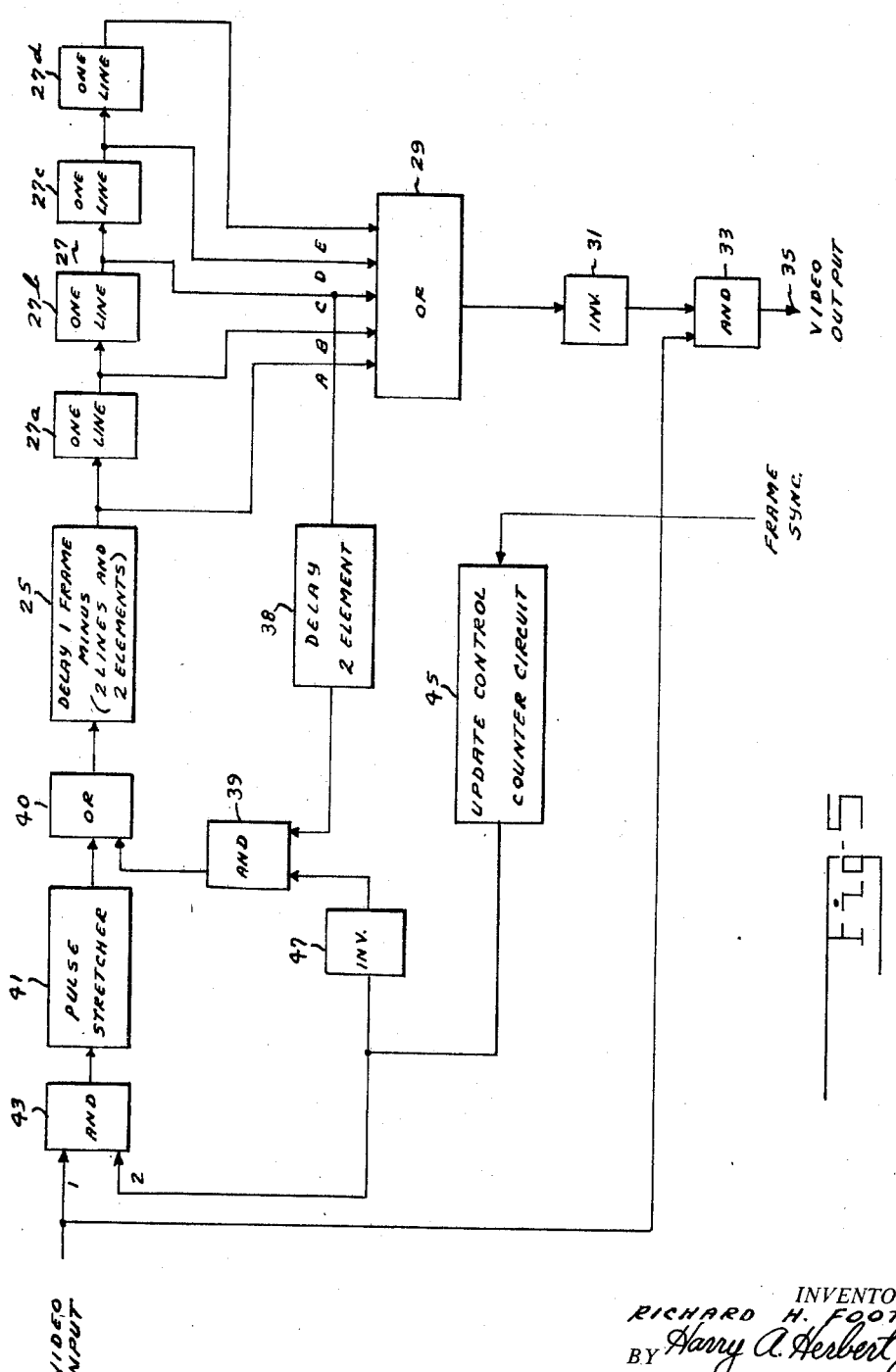

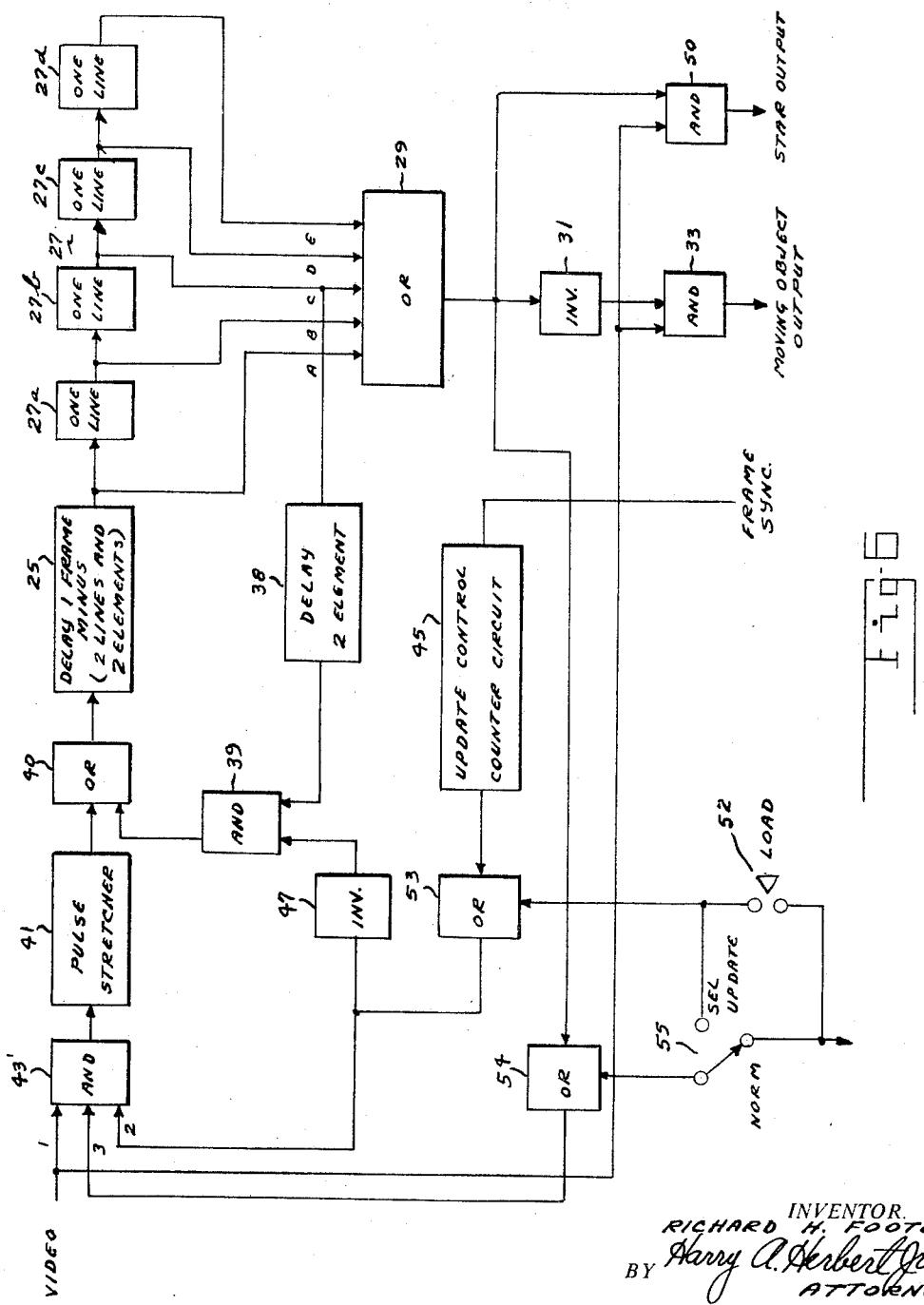

3,507,992
MOVING TARGET DISCRIMINATOR
Richard H. Foote, Fort Wayne, Ind., assignor to the United States of America as represented by the Secretary of the Air Force
Filed Sept. 26, 1967, Ser. No. 670,817
Int. Cl. H04n 7/00, 5/14
U.S. Cl. 178—6.8     5 Claims

ABSTRACT OF THE DISCLOSURE

To separate moving targets, in the output of an image orthicon, from stationary targets, comparisons are made between the targets appearing in different frames. A two-level video signal is applied to an AND circuit in the moving target discriminator. The signal is also applied to a delay device with the output of the delay device being inverted and applied as an inhibiting signal to the second terminal of the AND circuit. To permit some signal motion the delayed inhibiting signal is made larger than the target signal by stretching the pulse width delaying the pulse one frame minus (2 lines plus 2 elements), passing the stretched and delayed signal through four one-line delay devices to provide an inhibiting signal covering a 5 element on five adjacent lines. Other refinements permit the detection of slow moving targets by recycling the inhibiting signal, and updating stored information after a predetermined number of frames. A selective updating system is also provided.

Background of the invention

Moving object selectors are required to detect a moving target in the midst of stationary targets such as, for example, in separating satellites from stars.

There are three possible techniques for distinguishing between moving targets and stationary targets. First moving targets can be distinguished from stationary targets by the shape of the image seen by the image orthicon. The moving target will produce an elongated image while the stationary target will produce a round image. However, when the target motion is very small during a frame interval the elongation becomes very slight and discrimination on the basis of shape becomes impossible.

A second method is to compare the targets observed by the television camera with a map of the stars present in the field of view. However, the storage required to contain the entire map of the sky and the processing required to make the map comparisons would be tremendous.

The third and simplest method involves making several observations of the field of view and detecting any targets that have moved between the different observations.

Summary of the invention

According to this invention a practical and reliable system is provided for making comparisons between frames of the output of an image orthicon to determine which targets are stationary and which targets are moving. A blanking pulse is produced, inverted and compared with the video signal for the next or succeeding frames to permit the passage of only those targets to the output that have moved a predetermined amount between the frames compared.

Brief description of the drawing

FIG. 1 is a block diagram of the basic circuit for the moving target discriminator of the invention;

FIG. 2 shows wave forms used in describing the device of FIG. 1;

FIG. 3 is a block diagram of a more practical and reliable moving target selector than that shown in FIG. 1;

FIG. 5 is a block diagram of another embodiment of a moving target discriminator of the invention; and FIG. 6 is a block diagram of a further embodiment of the device of the invention.

Description of the preferred embodiment

Figure 4:
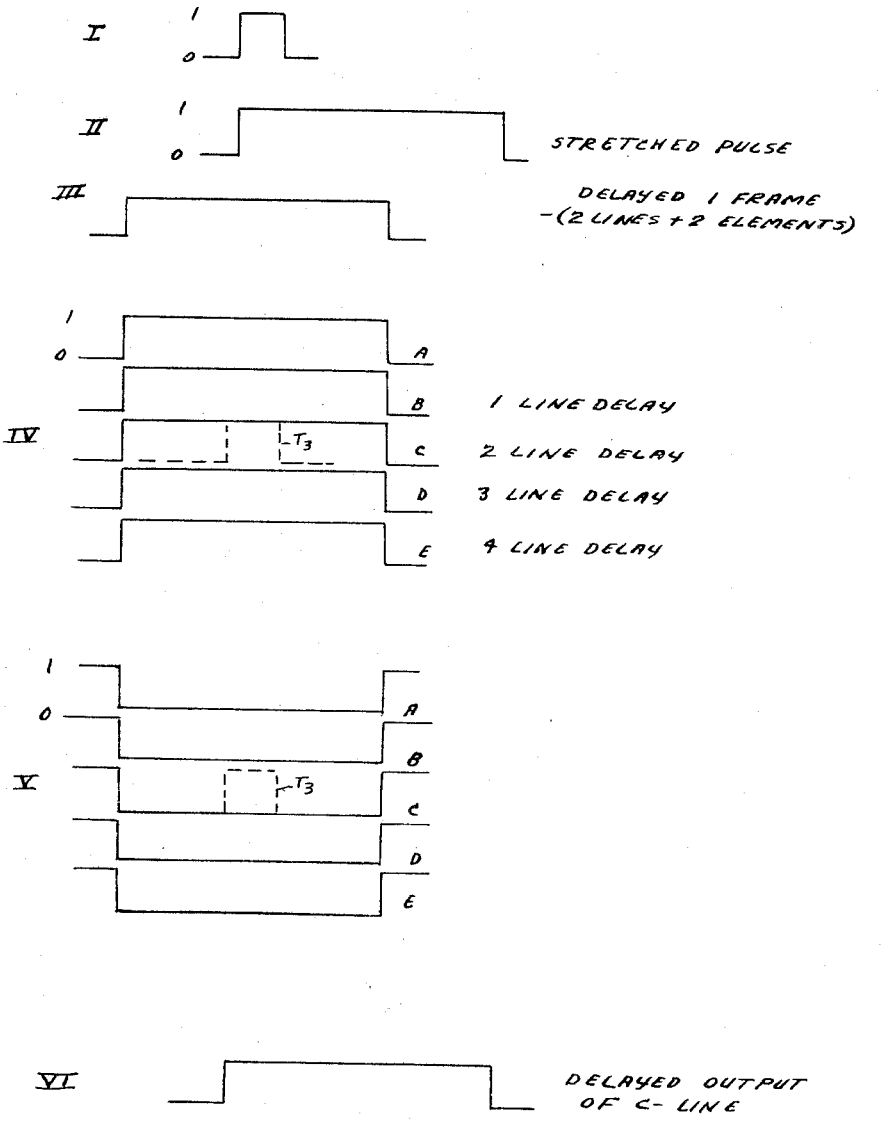
FIG. 4 shows a plurality of wave forms used in the explanation of the operation of the device of the invention.

Reference is now made to FIG. 1 of the drawing wherein the output of the image orthicon 10 is passed through a conventional camera preamplifier 11 and is then converted to a two-level signal in the normal manner in camera control video circuitry 12. The two-level signal will have a background or base line that can be considered a logic "0" level with all target signals at the logic "1" level. This signal is the input for the moving target discriminator of the invention.

The video input to the moving target discriminator 13 is applied to an AND circuit 15 and also to a one-frame delay device 17. The output of the delay device 17 is applied to a conventional inverting amplifier 19, with the output of the inverter being applied to a second terminal of AND circuit 15.

With reference to FIG. 2, assume that a moving target $T_1$ and a stationary target $T_2$ appear at the video input and the input signal is applied to AND circuit 15 and delay 17. Since these targets would not immediately appear in the output of inverter 19 the inverter output would be at the logic "1" level. With these targets also at the logic "1" level, both targets will appear in the output of the AND circuit. When the second frame is applied to the AND circuit the delayed and inverted first frame is also applied to the AND circuit. Since the target $T_2$ will not have moved, the direct input to the AND circuit will be at a logic "1" but the delayed inverted signal will be at the logic "0" level and no output will appear. The movement of the target $T_1$, however, will provide an output during the second frame from the AND circuit since both the direct input to the AND circuit and the delayed and inverted input will be at the logic "1" level. The target $T_1'$ appearing in the delayed output of the inverter will not produce an output since both the direct and delayed signals will be at the logic "0" level.

With the device thus far described the slightest motion of the targets, such as due to normal sidereal motion or jitter in the delay devices, will give rise to a moving target indication. The sensitivity must therefore be reduced so that some motion can be tolerated. This can be accomplished by making the inhibiting signal larger than the target. A device for making the inhibiting signal larger than the target by two signal elements or two lines in each direction will be described with reference to FIG. 3. As an example, if a target is present in the 50th signal element position of the 200th scan line, the inhibitive signal should extend from the 48th through the 52nd element on lines 198 through 202. To accomplish this the input pulse shown in wave form I of FIG. 4 is first stretched so as to increase its width by four elements. One method of doing this is shown in FIG. 3 wherein the video input is fed to a multitapped delay line indicated generally at 21 with a one element delay as indicated at 21a, 21b, 21c, 21d, between each tapping position. The outputs of the delay line 21 are applied to an OR circuit 23 with the output of the OR circuit being as shown in wave form II of FIG. 4. This output is then fed to a delay device 25 that delays the signal for a period which is less than one frame interval by a time equal to two lines and two elements. On the next frame scan then this signal will extend in the example given above, from the 48 to the 53 element as shown in wave form III of FIG. 4 on the 198 line. This signal is then applied to a multitapped delay line, indicated generally at 27, with a one-line delay indicated at 27a, 27b, 27c, 27d between each tapping position. The outputs of the delay line 27 are applied to an OR circuit 29 with the output of this OR circuit being as shown in wave forms IV. This signal is applied to the inverter 31 as in the device of FIG. 1 with the final inhibiting signal in the output of the inverter being as shown in the wave form V of FIG. 4 with the position of the target pulse being shown in dotted lines at $T_3$. The output of the inverter 31 is fed to the AND circuit 33. The input video signal is applied to the other input of AND circuit 33 as in the device of FIG. 1, with the output being taken off at 35.

To recognize targets which move at a slow rate such that they will not move the distance required within one frame interval, delay times of more than one frame between comparisons are necessary. It would appear therefore that delays of a greater amount, for example twelve frames, would be required for each frame. However, since the target motion is slow, there is more time to detect the motion so there is no need to compare each frame of video with the frame that occurred twelve frames earlier.

According to the invention, one frame is placed in storage for the next eleven frames and each incoming frame is then compared with the frame in storage. The slowest moving targets will not be detected until the twelfth frame, but faster targets will be detected in earlier comparisons depending on their velocity. At the end of the twelve frame interval, the information in storage is updated and the comparisons are then repeated.

The use of this technique in no way hinders the detection of the faster moving targets. If such targets enter the field of view anytime between updating intervals, they will be detected immediately. If they appear on the updating frame itself, they will pass through to the output once and will then be inhibited until they move the required three-element distance.

The storage of video information for the interval between periodic updatings is achieved by modifying the circuit as shown in FIG. 5. As can be seen in FIG. 4, if a signal such as shown in wave form II could be continually supplied to the circuit 25 of FIG. 3 for twelve intervals the remainder of the circuit could operate in the normal manner to provide the inhibit signal of wave forms V. If the wave form IV, C were delayed two elements as shown in wave form VI it would bear the same relation to the target signal as wave form II. Thus the output of the C line in FIG. 5 is fed to a two-element delay device 38 and then to one terminal of an OR circuit 40 through an AND circuit 39 the function of which will be described later. The other input to the OR circuit 40 comes from pulse stretcher 41 which may be the same as circuits 21 and 23 of FIG. 3. The video input is then applied to the pulse stretcher through an AND circuit 43 which blocks passage until a signal is applied to its other input. An updated control circuit 45 is synchronized by frame rate signals so that its output is a "1" for one complete frame and an "0" for eleven frames. The video frame sync signal is applied to a twelve place counter that provides a "1" output for one frame and an "0" for the next eleven frames. The signal of control circuit 45 is then applied to the second input of AND circuit 43. The output of the control circuit 45 is also applied to the second terminal of AND circuit 39 through an inverter 47. This inverted signal is at the "0" level for one frame and the "1" level for eleven frames to permit the delayed C line signal to be recirculated for eleven frames and then for blocking this signal during the update frame when the incoming video is applied to the OR circuit 40 through AND circuit 43 and pulse stretcher 41.

A further refinement of the invention is shown in FIG. 6. If the output of OR circuit 29 is also applied to a third input of a three-input AND circuit 43' (FIG. 6) only those targets which occur within the previously inhibited area will be allowed to enter the delay circuitry. This can be considered a selective update mode of operation. A load switch 52 is depressed to apply an enabling signal to the second terminal of AND gate 43' through OR gate 53 which is connected in the output of control circuit 45. An enabling logic "1" is applied to terminal 3 of AND gate 43' through switch 55 and OR gate 54 during normal operation as described above.

In the select update mode of operation with no targets in the delayed inhibiting circuit, the outputs A, B, C, D and E are all at the logic "0" level. With the output of OR gate 29 applied to AND gate 43' all video signals are blocked from entering the pulse stretcher 41. With switch 55 in the selective update position, the load switch 52 is depressed prior to the arrival of a satellite. This causes a logic "1" to be applied to terminals 2 and 3 of AND gate 43' and permits video signals from all targets in view to be admitted to the delay circuitry. When the inhibiting circuit is thus loaded all of these signals are blocked from the output circuit, but all additional signals later appearing will pass to the output regardless of their velocity.

A star output signal can be provided by applying the output of OR circuit 29 before inversion to a second AND circuit 50 together with the direct input of the incoming video signal, to its other input.

The OR and AND circuits can be conventional OR and AND logic circuits. The delay lines can be, for example, conventional magnetostrictive digital delay lines. It is to be understood that other delay devices which will provide the desired delays can be used.

There is thus provided an improved moving target discriminator which may be used to detect a moving target, such as a satellite, in the midst of a field of stationary targets such as stars.

While certain specific embodiments have been described, it is obvious that numerous changes may be made without departing from the general principles and scope of the invention.

I claim:
1. A device for distinguishing between moving targets and stationary targets in the output of an image orthicon tube, comprising an AND circuit having first and second inputs and an output; means for applying a two-level video signal to one of the inputs of said AND circuit; means, responsive to target signals in said video signal, for applying a stationary target inhibit signal to the second input of said AND circuit; said last-named means, including means for producing an inhibit signal extending a predetermined number of lines on either side of each target signal and a predetermined number of signal elements on either side of each target signal in each of said predetermined number of lines; said inhibit signal being delayed approximately one frame with respect to each of the target signals applied to said AND circuit.

2. The device as recited in claim 1 wherein said means for producing an inhibit signal includes: pulse stretcher means for providing a pulse having a duration equal to five target elements; a first delay means, connected to the output of said pulse stretcher means, for delaying its output signal for a period equal to one frame minus (two lines and two target elements); a second delay device; a five input OR circuit; means, connected between said delay device and said OR circuit for applying inputs to said OR circuit from five points, spaced along said second delay device by one line time interval; and an inverter amplifier connected to the output of said OR circuit and the target inhibit signal input of said AND circuit.

3. The device as recited in claim 2 including: recycling means connected between the center tap of said second delay device and the input of said first delay means for providing a signal input to said first delay means corresponding to the normal target output signal of said pulse stretcher; means, responsive to the frame sync signal of the image orthicon, for blocking the video input signal to said pulse stretcher for a predetermined number of frames and for passing the video signal for one frame after each predetermined number of frames and for blocking the signal from said recycling means for said one frame and for passing the signal from said recycling means for said predetermined number of frames.

4. The device as recited in claim 3 including: means, connected between the output of said OR circuit and the input of said pulse stretcher means, for selectively blocking all target signals from the input of said pulse stretcher means, for which signals do not appear in the output of said OR circuit; means, connected to said selective blocking means, for selectively admitting all target signals in said two-level video signal to said pulse stretcher means, whereby inhibit signals are provided at the input of said AND circuit for all of the stationary targets in a particular desired field of view of the image orthicon so that thereafter all additional signals will pass to said output regardless of their velocities.

5. The device as recited in claim 3 including a second AND circuit; means for connecting the output of said OR circuit directly to said second AND circuit; means for applying said two-level video to said second AND circuit whereby an output signal is provided for all stationary target signals in said two-level video signal.

References Cited

UNITED STATES PATENTS

| | | |
|---|---|---|
| 3,114,797 | 12/1963 | Williams. |
| 3,222,602 | 12/1965 | Gager _____ 343—7.7 |
| 3,257,505 | 6/1966 | Van Wechel _____ 178—6.8 |
| 3,341,653 | 9/1967 | Kruse _____ 343—7.7 |

ROBERT L. GRIFFIN, Primary Examiner

H. W. BRITTON, Assistant Examiner

U.S. Cl. X.R.

343—7.7